United States Patent [19]

Lode

[11] 4,229,679

[45] Oct. 21, 1980

[54] PLASMA CONTROL SYSTEM

[76] Inventor: Tenny D. Lode, 3270 Cherryridge Rd., Englewood, Colo. 80110

[21] Appl. No.: 476,530

[22] Filed: Jun. 5, 1974

[51] Int. Cl.² ............................................. H05H 1/10
[52] U.S. Cl. .................................. 315/111.7; 313/161
[58] Field of Search ......................... 315/111.6, 111.7; 176/3, 7; 313/161

[56] References Cited

U.S. PATENT DOCUMENTS

| | | | |
|---|---|---|---|
| 3,015,748 | 1/1962 | Hartwig et al. | 176/7 X |
| 3,085,173 | 4/1963 | Gibson et al. | 315/111.7 X |
| 3,093,569 | 6/1963 | Post | 313/161 X |
| 3,101,310 | 8/1963 | Post | 313/161 X |
| 3,143,477 | 8/1964 | Dolique | 176/3 |
| 3,166,477 | 1/1965 | Leboutet | 315/111.7 X |
| 3,170,841 | 2/1965 | Post | 313/161 X |

*Primary Examiner*—Palmer C. Demeo
*Attorney, Agent, or Firm*—Kinney, Lange, Braddock, Westman and Fairbairn

[57] ABSTRACT

A system for the magnetic confinement of a plasma for purposes such as the facilitating of thermonuclear fusion reactions. In one form, the major confining field is generated such that in local regions the magnetic field intensity increases with increasing distance from the central part of the confinement space. This provides a strong confinement in those local regions. The currents generating the major confinement field are time varying such that the local strong confinement regions move relative to each other and pass through the entire confinement space. Thus, the plasma is generally pumped through local strong confinement regions, and all parts of the confinement space are periodically subjected to a strong confining field.

13 Claims, 11 Drawing Figures

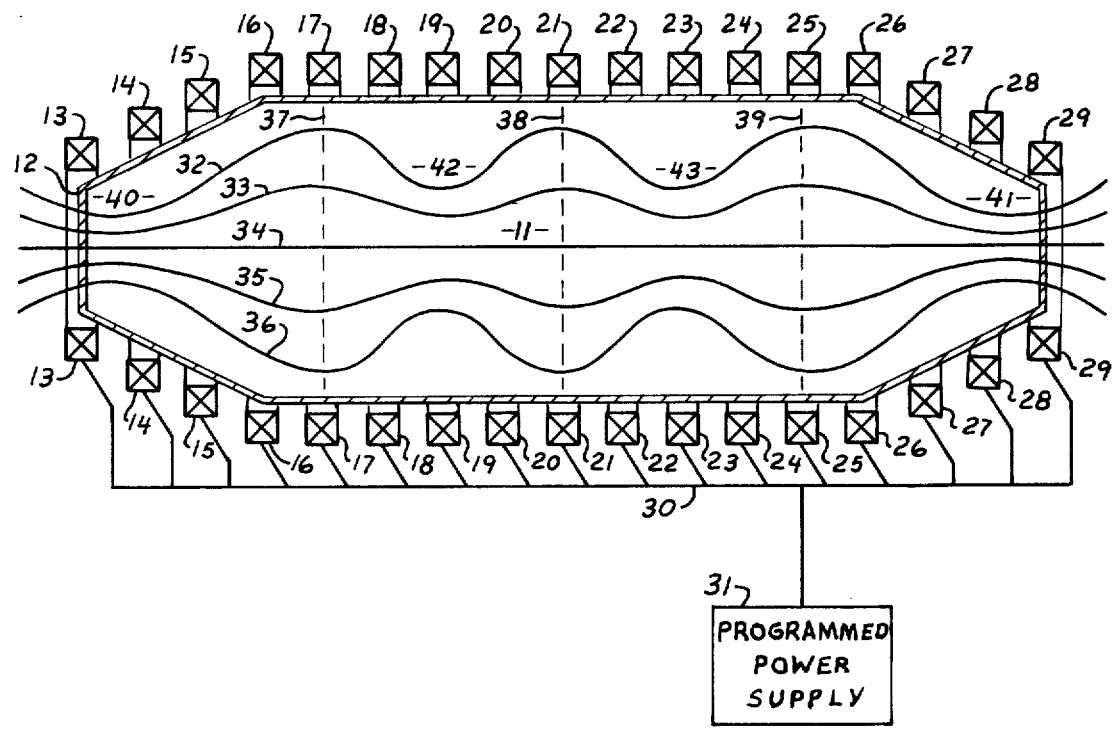
FIG_1

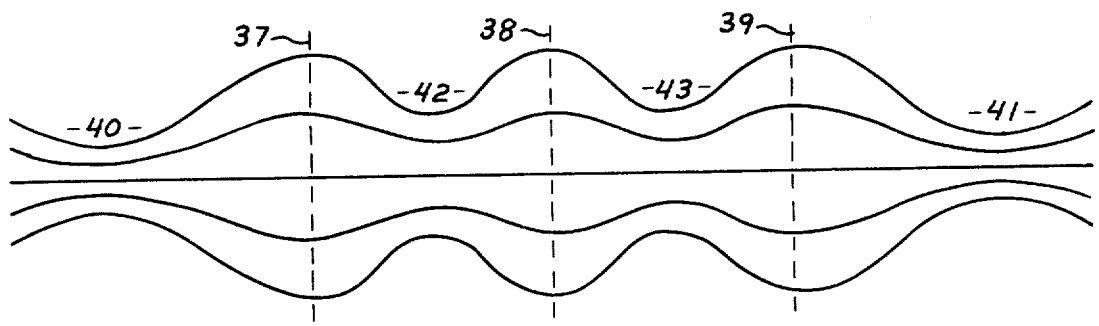
FIG_2A
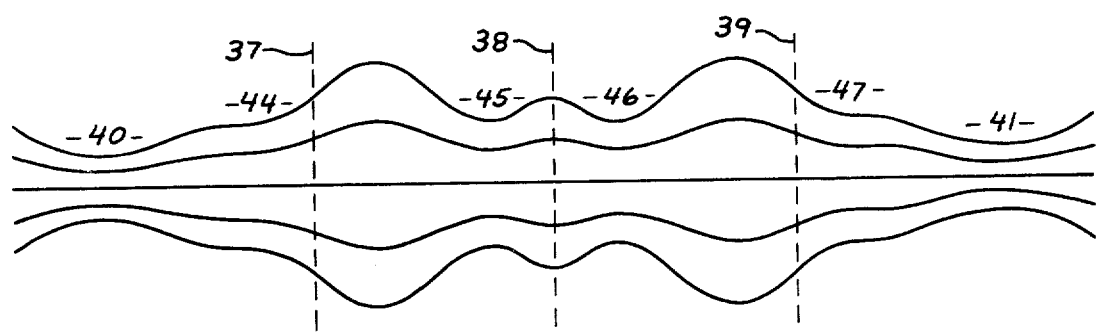
FIG_2B
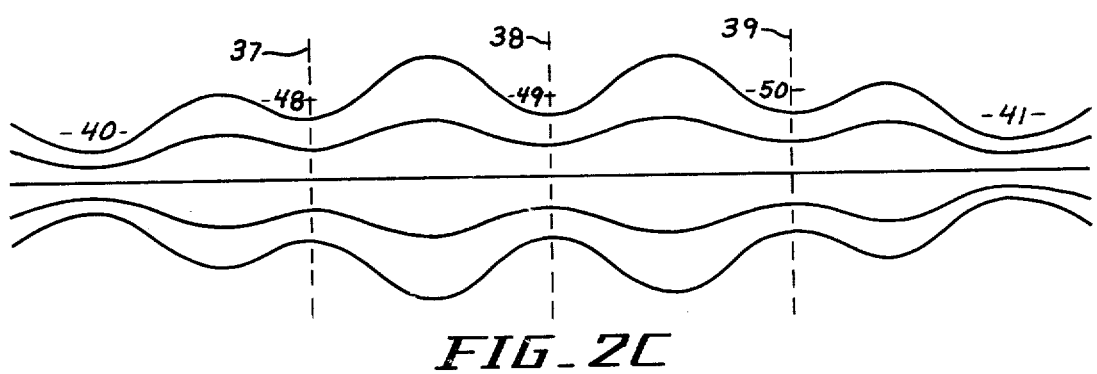
FIG_2C
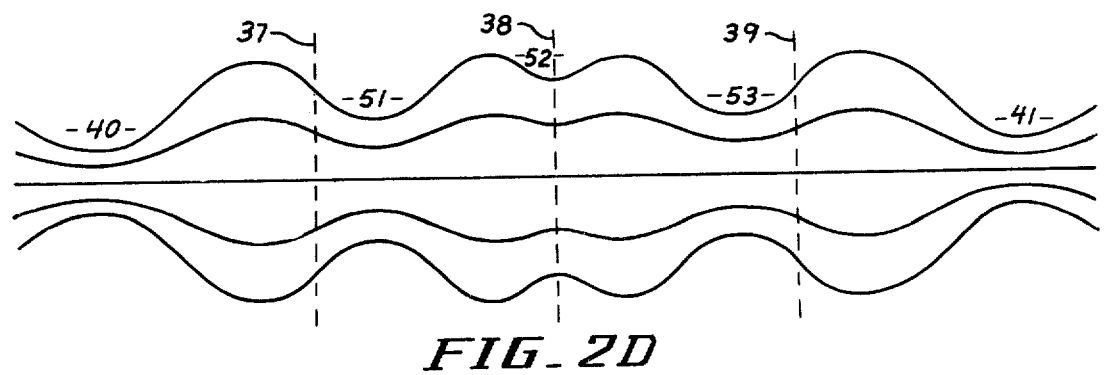
FIG_2D

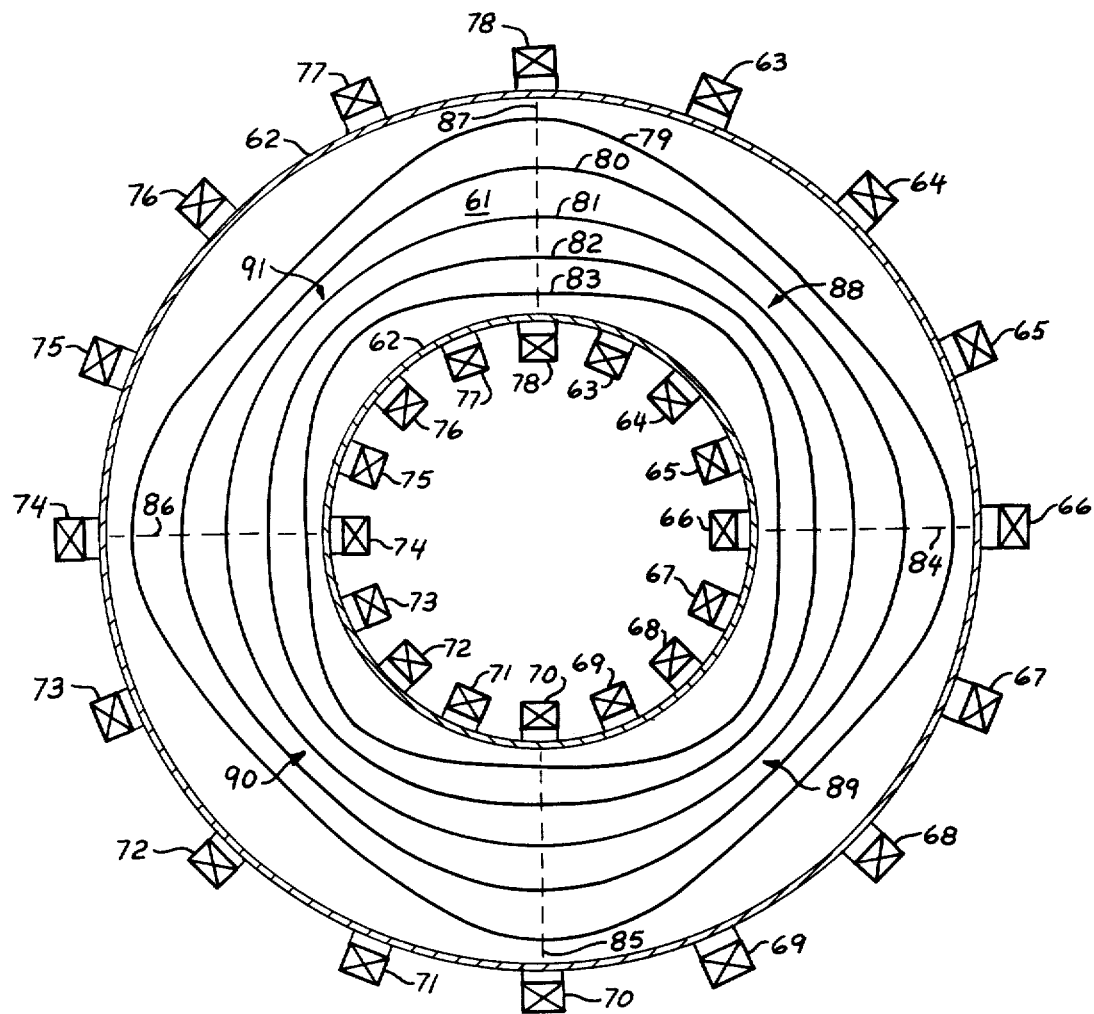
FIG_3

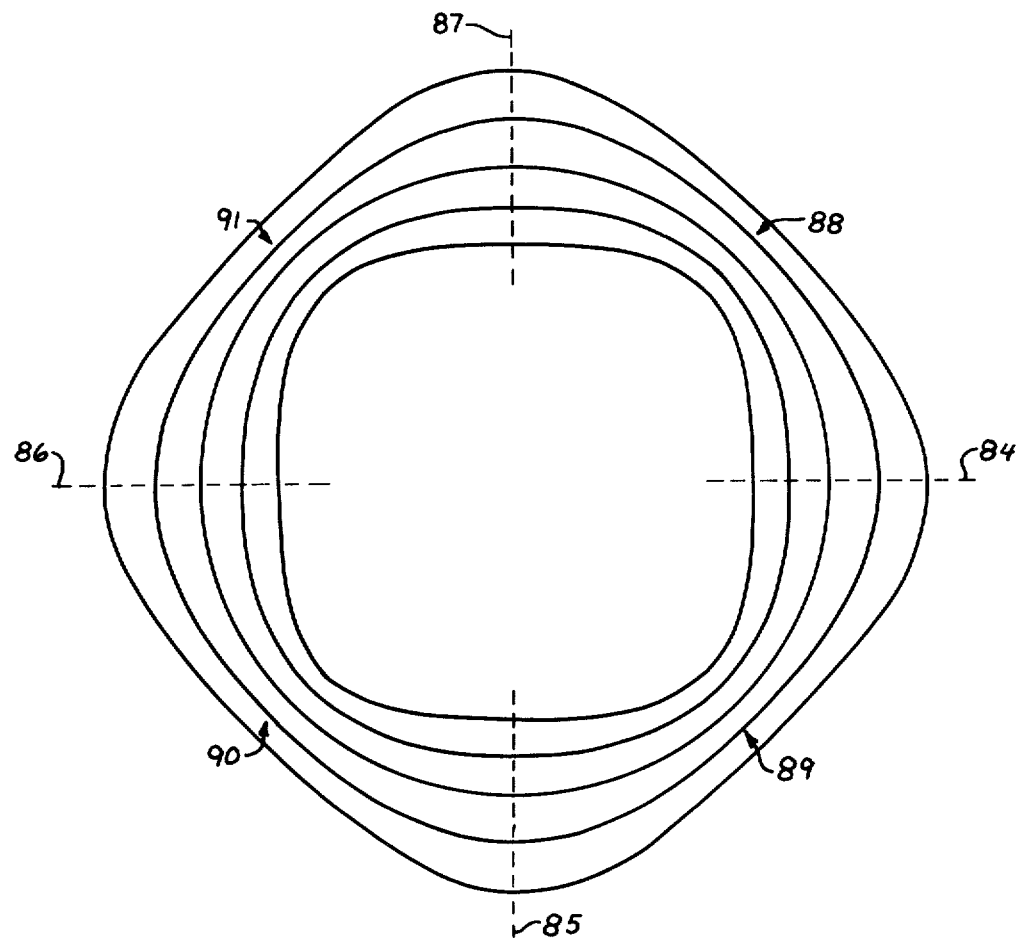
FIG_ 4A

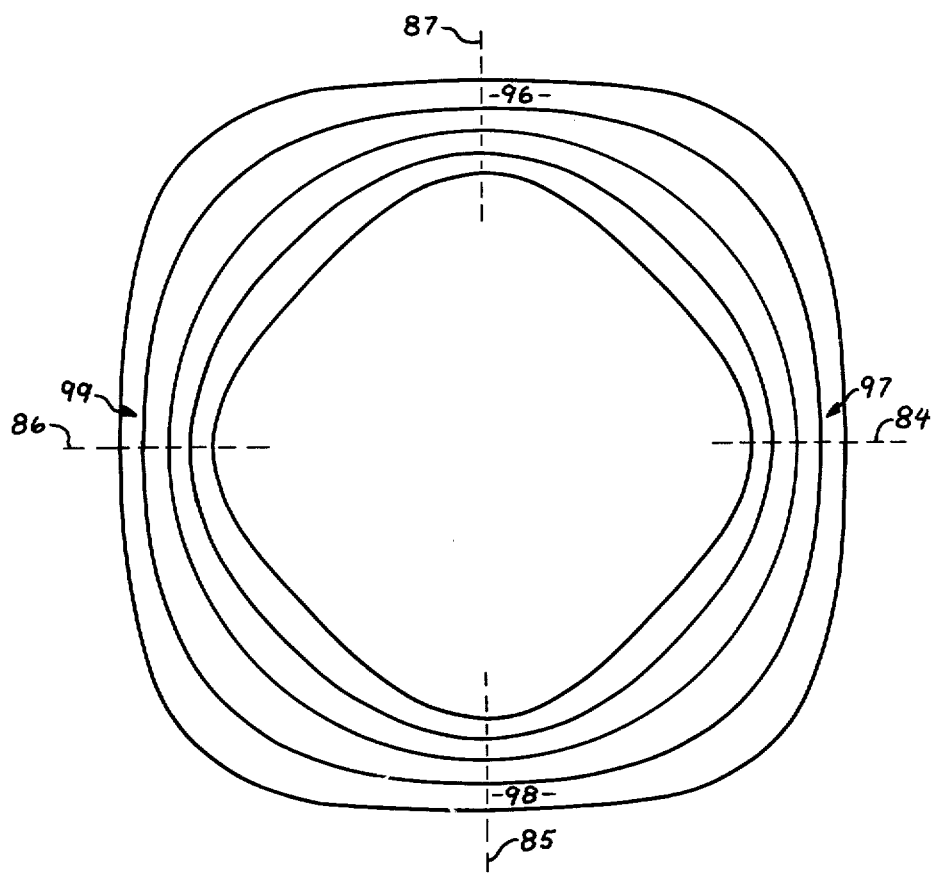
FIG_4C

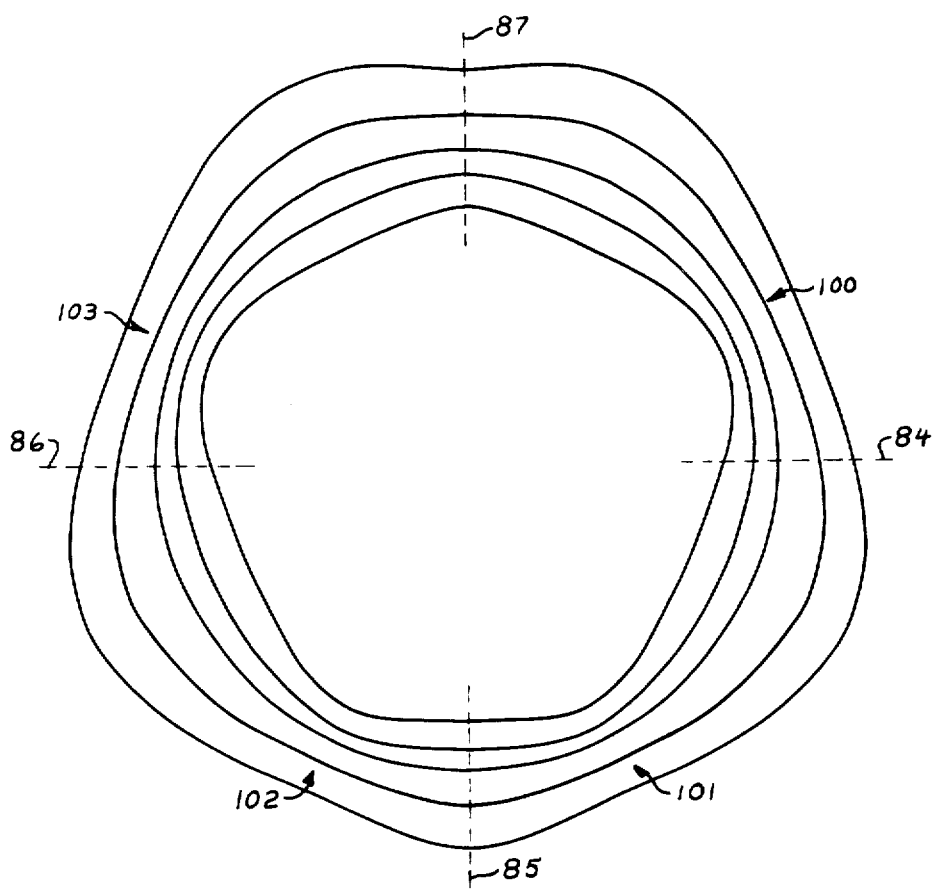
FIG_ 4D

PLASMA CONTROL SYSTEM

BACKGROUND OF THE INVENTION

This invention relates to the magnetic control and confinement of diamagnetic fluids such as plasmas and ionized gases. One of the problems in the study and application of plasmas is the confinement and control of the plasma within some region of space. The plasmas of interest for thermonuclear reactions are typically of low density and high temperature. For example, the density may be of the order of $10^{15}$ particles per cubic centimeter, or about 1/25,000 of the normal atmospheric density, and the temperature may be of the order of $10^6$ to $10^9$ degrees Kelvin. In an earthly environment, it is generally necessary to confine a plasma within a gas tight chamber because of the desired low density and to prevent contamination of the plasma. The high temperatures and generally high thermal conductivity of a plasma make it necessary to substantially eliminate contact between the plasma and the walls of the chamber and/or other solid structures.

Since plasmas are in general diamagnetic, one of the major techniques for plasma confinement has been the enclosure of the plasma within a magnetic field. However, conventional magnetic field confinement systems suffer from various forms of instabilities and/or may give a leaky or imperfect confinement. Descriptions of the properties of plasmas and various conventional methods for their confinement may be found in the published literature. For example, reference is made to the book *Controlled Thermonuclear Reactions* by Samuel Glasstone and Ralph Lovberg, published by D. van Nostrand Co., Inc., Princeton, New Jersey, 1960, which was prepared under the auspices of the Office of Technical Information, U.S. Atomic Energy Commission. A general description of certain thermonuclear processes which may be applicable to a controlled nuclear fusion reactor is given in U.S. Pat. No. 3,016,342, issued Jan. 9, 1962 to M. Kruskal et al, for a Controlled Nuclear Fusion Reactor.

Two of the major conventional types of plasma confinement systems are the magnetic mirror or pyrotron type systems and the ring type systems. Both the magnetic mirror and ring type systems will be used as examples of embodiments of the subject invention. In a typical magnetic mirror type system, the confinement space is generally in the shape of a right circular cylinder whose length is substantially longer than its diameter. The major confining magnetic field is generally parallel to the axis of the cylinder, and its intensity is greater at the ends of the cylinder than at the middle. The magnetic field generally retards motions of the plasma particles in directions transverse to the field. The stronger magnetic fields at the ends of the confinement region tend to reflect plasma particles back to the central portion of the cylinder. Hence, the name magnetic mirror type system. Two of the major types of plasma leakage of a magnetic mirror type system are leakage out through the ends because of imperfect mirroring, and general diffusion across the magnetic field throughout the confinement region. Other means such as radio frequency fields are sometimes used to further reduce the leakage from the ends. The subject invention is directed to the control of the general leakage across the magnetic field.

Descriptions of magnetic mirror type plasma confinement systems may be found, for example, in U.S. Pat. Nos. 3,003,080, Oct. 3, 1961, R. F. Post, Apparatus for Minimizing Energy Losses from Magnetically Confined Volumes of Hot Plasma; 3,015,748, Jan. 2, 1962, E. C. Hartwig et al, Pyrotron with Translational Closure Fields; 3,093,569, June 11, 1963, R. F. Post, Travelling Wave Pyrotron; 3,101,310, Aug. 20, 1963, R. F. Post, Magnetic End Closures for Plasma Confining and Heating Devices; 3,120,476, Feb. 4, 1964, R. F. Post, Pyrotron Process and Apparatus Utilizing Enhancement Principle; 3,160,566, Dec. 8, 1964, R. A. Dandl et al, Plasma Generator; 3,170,841, Feb. 23, 1965, R. F. Post, Pyrotron Thermonuclear Reactor and Process; 3,257,284, June 21, 1966, R. F. Post, Method of Controlling Plasma Stability; 3,655,508, Apr. 11, 1972, R. L. Hirsch, Electrostatic Field Apparatus for Reducing Leakage of Plasma from Magnetic Type Fusion Reactors; and 3,668,068, June 6, 1972, C. J. H. Watson, Plasma Confinement Apparatus.

In a typical ring type system, the confinement space is generally in the shape of torus. An object is to eliminate the end leakage, such as in magnetic mirror type systems, by closing the confinement space and the major confining magnetic field upon itself so that there are no open ends. A difficulty with ring type systems is that the confining space and confining fields are curved, and the variation of the magnetic field intensity with position is more complex. This can cause additional forms of instability and leakage.

Descriptions of ring type plasma confinement systems may be found, for example, in U.S. Pat. Nos. 2,910,414, Oct. 27, 1959, L. Spitzer, Jr., High Temperature Apparatus; 3,002,912, Oct. 3, 1961, L. Spitzer, Jr., Reactors; 3,012,955, Dec. 12, 1961; R. M. Kulsrud et al, High Temperature Reactor; 3,015,618, Jan. 2, 1962, T. H. Stix, Apparatus for Heating a Plasma; 3,016,341, Jan. 9, 1962, L. Spitzer, Jr., Reactor; 3,029,199, Apr. 10, 1962, W. R. Baker et al, Plasma Device; 3,085,173, Apr. 9, 1963, G. Gibson et al, Apparatus for Trapping Energetic Charged Particles and Confining the Resulting Plasma; 3,088,894, May 7, 1963, H. R. Koenig, Confinement of High Temperature Plasma; 3,143,477, Aug. 4, 1964, Jean-Michel Dolique, Plasma Confining Device; 3,171,788, Mar. 2, 1965, J. G. Gorman et al, Rotating Plasma Device; 3,219,534, Nov. 23, 1965, H. P. Furth, Plasma Confinement Apparatus Employing a Helical Magnetic Field Configuration; 3,278,384, Oct. 11, 1966, A. Lenard et al, Negative V Stellarator; 3,508,104, Apr. 21, 1970, C. M. Braams, Apparatus for the Stable Confinement of a Plasma; 3,607,627, Sept. 21, 1971, H. P. Furth, Stellarator Configuration Utilizing Internal Separatrices; 3,663,362, May 16, 1972, T. H. Stix, Controlled Fusion Reactor; and 3,674,634, July 4, 1972, C. J. H. Watson, Plasma Confinement Apparatus.

Since a plasma is a diamagnetic fluid, it will tend to diffuse or move away from a region of higher magnetic field intensity towards a region of lower magnetic field intensity. In either a magnetic mirror or ring type system, it would be desirable if it were possible to arrange the confining magnetic field so that its intensity always increased with distance away from the central part of the confinement region. Such a field configuration does not appear to be physically possible, at least not for fields which are generally parallel to the central part of an extended confinement region. It is known that the confining field configuration of a ring type system may be arranged so that there are local strong confinement regions in which the magnetic field intensity increases with distance away from the central part of the confinement region. Such systems are sometimes referred to as "bumpy torus" configurations. Descriptions of bumpy torus systems are given in previously referenced U.S. Pat. Nos. 3,085,173 and 3,143,477. Bumpy torus systems generally provide a more effective confinement of the plasma in the local strong confinement regions, but do not provide effective plasma confinement in the regions between the local strong confinement regions.

SUMMARY OF THE INVENTION

The subject invention is applicable as an additional confinement means in combination with a confinement system such as a magnetic or ring type system. In one form, the confining magnetic field is arranged with a number of individual local strong confinement regions, spaced along the length of a confinement space. The electric currents generating the local strong confining fields are time varying, such that the local strong confinement regions move relative to each other and pass through substantially the entire confinement space. Thus, the plasma is generally pumped through local strong confinement regions, and substantially all parts of the confinement space are periodically subjected to a strong confining field.

An object of this invention is to provide means for the control and confinement of diamagnetic fluids such as plasmas and ionized gases.

A further object is to provide means for plasma confinement to facilitate thermonuclear reactions.

A further object of the invention is to provide means for plasma confinement in combination with and in addition to other means of plasma confinement.

Additional objects may be seen by reference to the drawings, the following specification and the claims.

BRIEF DESCRIPTION OF THE DRAWINGS

FIG. 1 is a cross section illustration of a first form of the invention generally arranged as a magnetic mirror type confinement system;

FIGS. 2A through 2D are diagrammatic illustrations of magnetic field configurations in the system of FIG. 1, showing the time variation thereof;

FIG. 3 is a cross section illustration of a second form of the invention generally arranged as a ring type confinement system;

FIGS. 4A through 4D are diagrammatic illustrations of magnetic field configurations within the system of FIG. 3, showing the time variation thereof.

DESCRIPTION OF THE PREFERRED EMBODIMENTS

Figure 4B:
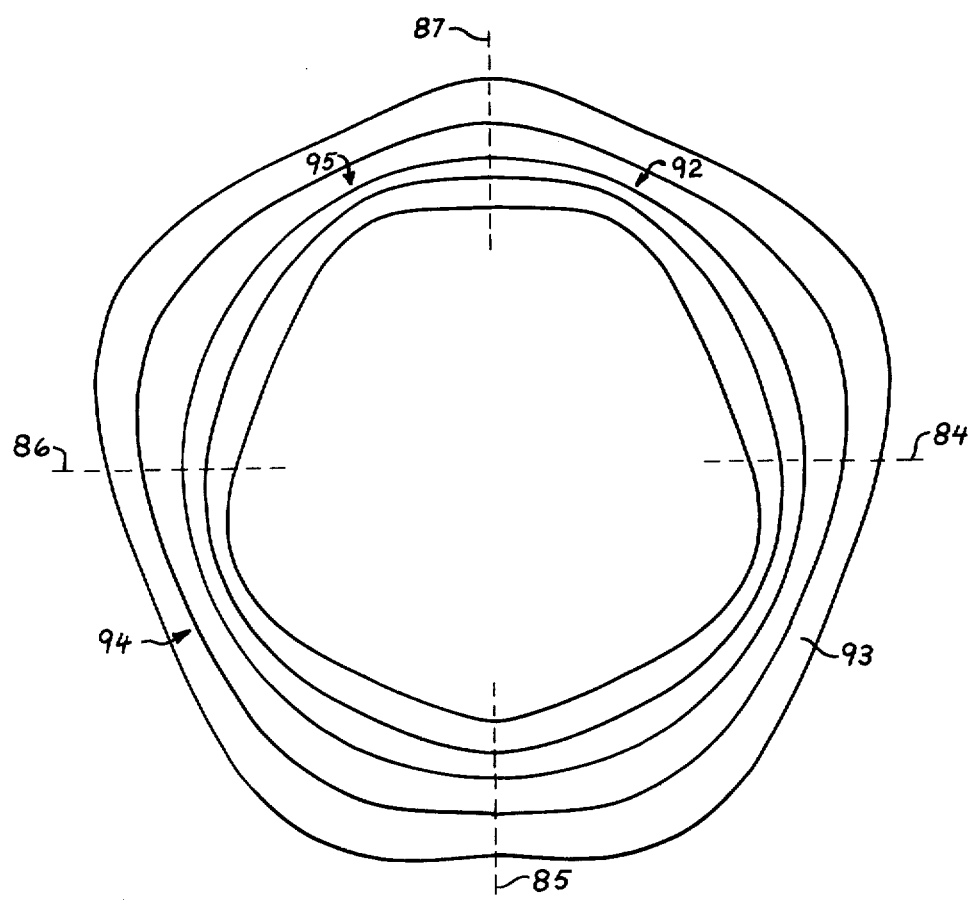

FIG. 1 is a cross section illustration of a first form of the invention generally arranged as a magnetic mirror type confinement system. In FIG. 1, plasma region 11 is contained within chamber 12. The chamber is formed with suitable walls and is shown only schematically. Electromagnet coils 13 through 29 are arranged along the outside of chamber 12 and, when energized, generate a magnetic field within chamber 12. The coils 13 through 29 surround the chamber 12 and are on the outside of the walls forming chamber 12. Coils 13 through 29 are each connected to line 30 which is connected to programmed power supply 31. Line 30 is a multiple conductor cable and is intended to generally indicate the individual connections of coils 13 through 29 to separate portions of programmed power supply 31. Magnetic field lines 32 through 36, representing the magnetic field within chamber 12, are shown to facilitate the subsequent description. Dotted lines 37, 38 and 39 are parallel to the planes of coils 17, 21 and 25, respectively, and will be referenced in the subsequent description. End regions 40 and 41, and strong confinement regions 42 and 43 are identified so that they may be subsequently referenced.

The current to each of the coils is individually controlled by the programmed power supply 31. Programmed power supplies which vary power to a load on a time basis are known. For example, programing circuitry is shown generally in U.S. Pat. No. 3,170,841 and also in U.S. Pat. Nos. 3,015,748 and 3,166,477.

In the present construction the programmed power supply 31 would include known components for sequentially and cyclically varying the current (or, if desired, voltage) to the coils and also includes means in the programmer portion to synchronize the cycling of the current (or voltage) between adjacent coils to obtain the desired movement of the local strong magnetic field confinement areas, as will be explained. At the same time, the current to the end coils will remain high to provide strong confinement areas at the ends of chamber 12.

In a simple form, mechanical programmers which operate varying resistances that are operationally ganged together in a desired relationship may be used to vary the current to each coil used in a cycle of operation. The current level of each coil in relation to adjacent coils could also be controlled. Solid state controls providing a varying current to each coil in a time cycle and which synchronize the current provided to each coil with the current to other coils are known in the art.

The system of FIG. 1 is generally a magnetic mirror or pyrotron type device, such as is shown and described in the previously listed references. Various features of an operating plasma device which are not specifically shown in FIG. 1, such as means for plasma injection, means for plasma heating, additional means for confinement of the plasma at the end regions, means for vacuum pumping, means for contaminant removal, etc. are not shown as they may be, for example, of the forms shown in the previously listed references.

In typical operation, coils 13 through 29 are energized so as to generate a magnetic field which extends generally between end regions 40 and 41 as indicated by magnetic field lines 32 through 36. As is typical in pyrotron type machines, coils 13, 14, 15 and 27, 28 and 29 are arranged and energized such that the magnetic field in end regions 40 and 41 is particularly intense so as to aid in generally confining the plasma away from end regions 40 and 41. At a particular instant, as shown in FIG. 1, coils 19 and 23 will be more strongly energized, coils 17, 21 and 25 will be less strongly energized and coils 18, 20, 22 and 24 will be energized at an intermediate level so that the magnetic field configuration is as shown in FIG. 1. The programmed power supply is used to provide the individual energization levels of the coils as described. The magnetic field intensity in strong confinement regions 42 and 43 will be more intense and the curvature of the magnetic field will be generally away from the central axis as indicated by magnetic field lines 32 through 36. The magnetic field intensity at the regions indicated by lines 37, 38 and 39 will be less intense, and the curvature will be generally towards the central axis as indicated by magnetic field lines 32 through 36.

It is known that in a curved magnetic field, the intensity of the magnetic field generally increases in the direction of curvature. Since a plasma is a diamagnetic fluid, it will tend to drift from a region of greater magnetic field intensity towards a region of lower magnetic field intensity. In a curved magnetic field, a plasma will tend to drift in a direction opposite the curvature of the magnetic field. In strong confinement regions 42 and 43, the curvature is away from the central axis and field line 34. Hence, the confined plasma will tend to drift towards the central axis. However, in the regions at lines 37, 38 and 39, the magnetic field curvature is towards the central axis and the plasma will tend to drift away from the central axis. Hence, the confinement in regions 42 and 43 is a strong confinement in which the plasma will tend to be confined near the central axis of chamber 12. The confinement at lines 37, 38 and 39 is a weak confinement in which the plasma will tend to drift away from the central axis.

If it were possible to construct a simple machine in which a leak free, strong confinement field could be generated everywhere within a desired plasma confinement region, the plasma confinement problem would be a relatively simple one. However, as far as is known, there are no practical configurations which have this property. In the system of FIG. 1, at any particular instant, a strong confinement is provided in certain regions within chamber 12. An overall general confinement is provided by having the currents through coils 13 through 29 be time varying and different in adjacent coils or sets of coils, such that the individual strong confinement regions move on a time basis relative to chamber 12 and to each other.

The operation of the system of FIG. 1 is illustrated in greater detail in FIGS. 2A through 2D, which are diagrammatic illustrations of magnetic field configuration in the system of FIG. 1 showing the time variations thereof. In FIGS. 2A through 2D, lines 37, 38 and 39 correspond to lines 37, 38 and 39 of FIG. 1, and are used as space reference lines to show more clearly the movement of the magnetic field lines shown in FIGS. 2A through 2D. End regions 40 and 41 of FIGS. 2A through 2D correspond to end regions 40 and 41 of FIG. 1.

FIG. 2A corresponds to the magnetic field configuration illustrated in FIG. 1. End regions 40 and 41 are regions of maximum magnetic field intensity and also strong confinement regions. Because of the manner in which coils 13 through 29 are energized, two additional strong confinement regions, 42 and 43, are also generated midway between lines 37 and 38 and midway between lines 38 and 39 due to the strong energization of coils 19 and 23, as previously explained.

One quarter of a cycle later, the programmed power supply will be providing power to the coils so that the magnetic field configuration within chamber 12 will be as shown in FIG. 2B. Coils 16, 20, 22 and 26 are now strongly energized by the programmed power supply, thereby generating strong confinement regions 44, 45, 46 and 47. Strong confinement regions 45 and 46 correspond to strong confinement regions 42 and 43 and show that these strong confinement regions have now moved closer to line 38. Strong confinement regions 44 and 47 are beginning to form in the vicinity of end regions 40 and 41, just outside of lines 37 and 39. Coils 17, 19, 21, 23 and 25 are at an intermediate energization level, and coils 18 and 24 would be less strongly energized.

One half cycle after the FIG. 2A field configuration, coils 17, 21 and 25 will be strongly energized, and coils 19 and 23 would be less strongly energized, causing the generation of a magnetic field pattern as shown in FIG. 2C. Strong confinement regions 48, 49 and 50 are now present in the vicinities of lines 37, 38 and 39. Strong confinement region 49 represents a merger of strong confinement regions 42 and 43 which have both moved to line 38. Confinement regions 48 and 50 are the result of the growth and motion of strong confinement regions 44 and 47.

Three quarters of a cycle after the FIG. 2A field configuration, coils 18 and 24 will be strongly energized causing the generation of the magnetic field pattern shown in FIG. 2D. Strong confinement regions 51 and 53 correspond to strong confinement regions 48 and 50, and show that they are continuing to move towards line 38. Strong confinement region 52 corresponds to strong confinement region 49 but is generally weaker. The cycle then repeats, with the magnetic field configuration going back to that shown in FIG. 2A.

Thus, in the operation of the system of FIG. 1, a series of strong confinement regions are generated in end regions 40 and 41 by the programmed power supply and the electromagnet coils, and are swept in towards line 38 by sequentially varying the current to the appropriate coils. This has the effect of pumping the outer portions of a confined plasma towards line 38, where it will eventually be subjected to a strong confinement field such as in region 49 of FIG. 2C. At any particular time, the individual strong confinement regions extend over only a portion of the plasma region within chamber 12. However, the motion of the individual strong confinement regions relative to chamber 12 and towards each other is such that any given region within chamber 12 will be periodically subjected to a strong confinement field, and such that the outer portions of the confined plasma are pumped through strong confinement regions. This provides an average or general strong confinement.

The coils and the programmed power supply are thus used as means to cause the strong confinement regions to move.

FIG. 3 is a cross section illustration of a second form of the invention generally arranged as a ring type confinement system. In FIG. 3, plasma confinement region 61 is within an annular chamber 62, which is generally of a ring or toroidal shape. Electromagnetic coils 63 through 78 encircle chamber 62 and, when energized, generate a magnetic field within chamber 62. Magnetic field lines 79 through 83 are shown and will be referenced subsequently. Dotted lines 84 through 87 identify certain positions within chamber 62 and will be referenced subsequently. Strong confinement regions 88 through 91 are identified so that they may be referenced subsequently. Coils 63 through 78 are individually connected to a suitable programmed power supply in the general manner shown for the connection of coils 13 through 29 of FIG. 1 and the connections are omitted in FIG. 3. The power supply used with the system of FIG. 3 also individually controls the current to each coil and may vary the current on a time basis.

One of the obvious causes of leakage or imperfect plasma confinement in a magnetic mirror or pyrotron type device, such as in FIG. 1, is the leakage due to plasma particles traveling along the magnetic field lines through the end regions and impacting the walls of the confinement chamber. In a ring type device such as shown in FIG. 3, the confining magnetic field is generated in a form which is topologically equivalent to a toroid so that there is no end leakage. The necessary bending of the magnetic field does introduce other problems, however, which are well known in the field of ring type plasma confinement systems.

In the system of FIG. 3, coils 64, 68, 72 and 76 are strongly energized so that the magnetic field is most intense near these coils. This causes the generation of strong confinement regions 88 through 91, in which the magnetic field lines curve generally away from the center of the confinement region.

The operation of the system of FIG. 3 is illustrated in greater detail in FIGS. 4A through 4D, which are diagrammatic illustrations of magnetic field configurations within the system of FIG. 3, showing the time variation thereof. FIG. 4A corresponds to the field configuration shown in FIG. 3. Because of the manner in which coils 63 through 78 are energized, strong confinement regions 88, 89, 90 and 91 are generated midway between lines 84, 85, 86 and 87.

FIG. 4B illustrates the magnetic field configuration one quarter cycle later. Coils 63, 67, 73 and 77 are now strongly energized so that strong confinement regions 88 and 91 have moved up to become strong confinement regions 92 and 95, and strong confinement regions 88 and 90 have moved up to become strong confinement regions 93 and 94.

FIG. 4C illustrates the magnetic field configuration one half cycle after the FIG. 4A configuration. Coils 66, 70, 74 and 78 are now strongly energized so that strong confinement regions 88 and 91 have moved upward and merged to become strong confinement region 96. Strong confinement regions 88 and 90 have moved up to become strong confinement regions 97 and 99, and a new strong confinement region 98 has been formed in the vicinity of line 85.

FIG. 4D illustrates the magnetic field configuration three quarters of a cycle after the FIG. 4A configuration. Strong confinement regions 89 and 90 have moved up to become strong confinement regions 100 and 103. The new strong confinement region 98 shown in FIG. 4C in the vicinity of line 85 has split and has become individual strong confinement regions 101 and 102 because coils 69 and 71 are strongly energized and coil 70 is at an intermediate level of energization. The magnetic field configuration then repeats the cycle, passing through the configurations shown in FIGS. 4A through 4D again.

Thus, the individual strong confinement regions in the system of FIG. 3 move in a generally upward direction relative to chamber 62, and move relative to each other, and toward each other, such that any given region within chamber 62 will be periodically exposed to an individual strong confinement region. In addition, the outer plasma regions in the weak confinement areas are swept in a generally upward direction toward dotted line 87, such that they are eventually exposed to a strong confinement field in the vicinity of dotted line 87 such as shown in FIG. 4C. As in the case of the system of FIG. 1, this provides an average or general confinement effect.

Figure 5:
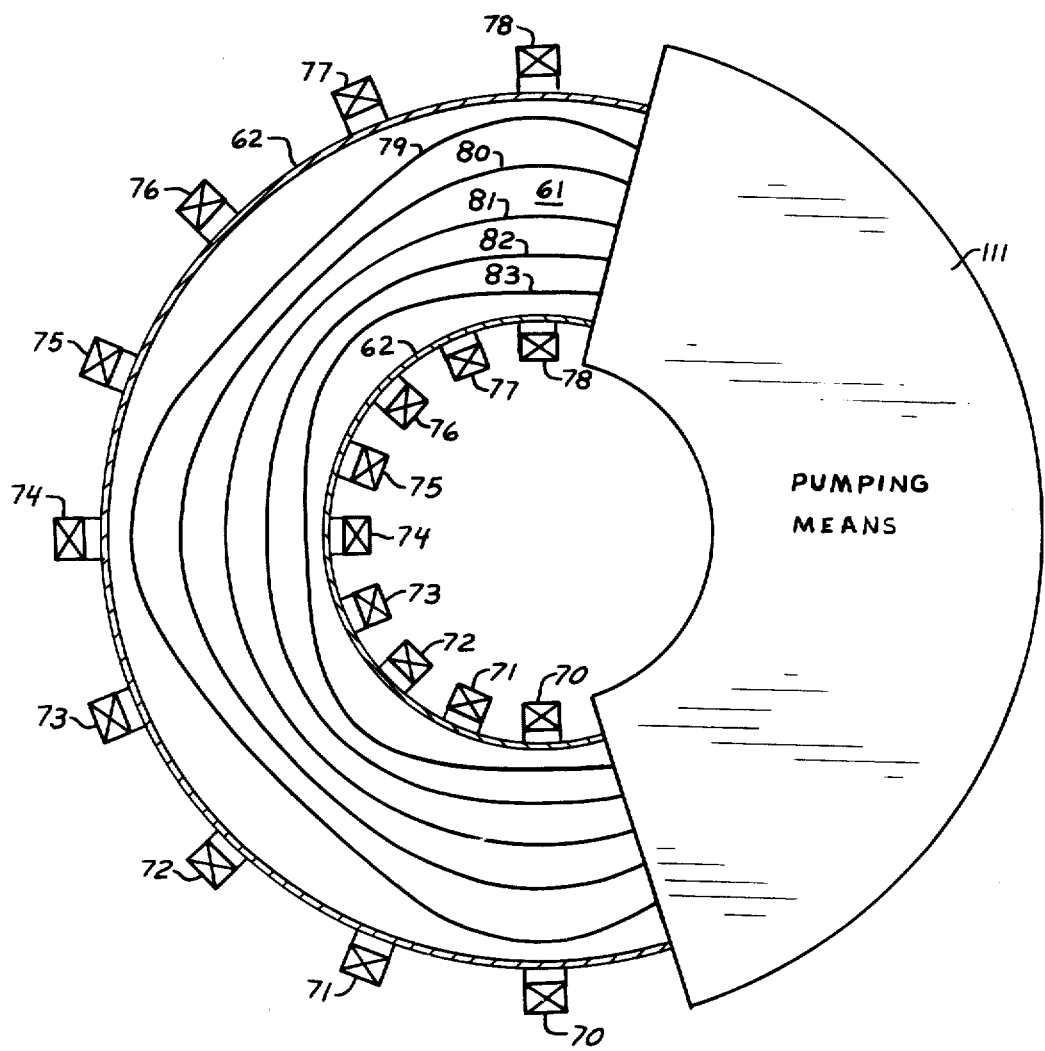
FIG. 5 is a diagrammatic illustration of a third form of the invention illustrating the general use of fluid pumping means therein.

FIG. 5 is a diagrammatic illustration of a third form of the invention illustrating the general use of fluid pumping means therein. In FIG. 5, plasma confinement region 61 is contained within chamber 62. Electromagnet coils 70 through 78 encircle chamber 62 and, when energized, generate a plasma confinement magnetic field therein. The magnetic field is indicated by magnetic field lines 79 through 83. FIG. 5 also includes pumping means 111 which is used to pump plasma through the chamber 62. The pumping means 111 may be conventional magnetic plasma pumping means now in use and described in the prior art.

Plasma confinement region 61, chamber 62, coils 70 through 78 and magnetic field lines 79 through 83 of FIG. 5 correspond to the similarly numbered elements in FIG. 3. The difference is the use of pumping means 111 in place of portions of the structure of FIG. 3.

Coils 63 through 69 of FIG. 3 may be regarded as a form of pumping means to pump portions of the confined plasma in the direction of dotted line 87. FIG. 5 is intended to illustrate that such plasma pumping means may be of a more general or conventional form, and that an average or general confinement may be provided by a combination of a magnetic field structure which includes individual strong confinement regions at coils 72 and 76 and pumping means which pumps the plasma relative to the individual strong confinement regions. Depending on the nature of pumping means 111, the strong confinement regions at coils 72 and 76 in the system of FIG. 5 may or may not be required to move relative to chamber 62 and pumping means 111. The plasma is passed through the strong confinement regions under action of the pumping means 111.

The desirable frequency of the cyclic magnetic field variations in the operation of the invention will depend on the arrangement and characteristics of the particular confinement device. In general, the desirable operating frequency will be lower than the cyclotron resonant frequencies of the plasma in the major confining field, such that the local strong confinement field regions tend to affect the plasma as a conducting fluid in a collective manner.

The preceding disclosure has shown and described certain specific forms of the subject invention. There are many variations of the invention which may be made individually or in combination. Some of these variations are described below.

The preceding description has shown the application of the subject invention to magnetic mirror or pyrotron type plasma confinement devices and to ring type plasma confinement devices. The general principles of the subject invention are not limited thereto, and may be applied to a wide variety of plasma confinement devices including those of other shapes and configurations.

Particular forms of the subject invention have been shown and described with particular motion and time variation patterns for the confining magnetic field and the individual local strong confinement field regions. Other forms of the invention may be arranged with other motion and/or time variation patterns.

The preceding disclosure has described systems in which a non-zero number of local strong confinement regions are present at all times. The local strong confinement regions move, are formed, separate, merge and/or disappear, and their number may change, as the confinement field pattern changes in a generally cyclic manner. Variations of the invention may be devised in which the number of local strong confinement regions is temporarily zero from time to time.

For convenience and clarity of illustration, the figures have shown arrangements with a relatively small number of individual local strong confinement field regions. Other configurations of the subject invention may be arranged with different numbers of local strong confinement regions and, in particular, with larger numbers of local strong confinement regions.

The figures and the preceding description have not described previously known plasma confinement techniques in great detail. In many instances, such as in the ring structure shown in FIGS. 3 and 5, it will be appropriate to use other means such as electromagnetic coil configurations providing shear magnetic fields to improve the stability of the plasma confinement.

In many of the known plasma confinement systems, such as those shown in the previously listed references, a number of individual techniques and means are used for the actual confinement process. In many instances, it will be appropriate to use the subject invention as an additional means for plasma confinement in a system which includes one or more other plasma confinement means.

Pumping means 111 may be, for example, any of a number of known means for the pumping of and/or retarding of motion of conducting fluids such as plasmas.

In the claims, the term confinement space is intended to imply a space within which a diamagnetic fluid or plasma is to be generally confined. In many instances, the confinement space will be elongated and will extend generally along a central line. In a typical magnetic mirror type confinement system, the central line will extend from one end or mirror region to the other in a generally straight line. In a typical ring type confinement system, the central line will be closed on itself in the general form of a ring or other closed shape. The term local strong confinement region is intended to imply a local region in which the magnetic field intensity generally increases with increasing distance from the central region or central line of the confinement space, such that a diamagnetic fluid or plasma will tend to generally diffuse towards the central region or line. The term local weak confinement region is generally intended to imply a region which is not a local strong confinement region. A local weak confinement region may be, for example, one in which the magnetic field intensity generally decreases with increasing distance away from the central region or line of a confinement space, such that a diamagnetic fluid will tend to diffuse away from the central region or line. The term subset is intended to its broad sense. A particular subset may include an entire set of which it is a subset. Two subsets of the same set may or may not overlap. The terms frequency and periodic refer to variations which are of a generally repetitive nature, but not necessarily of constant frequency, period or repetition pattern. The term pumping means is intended in a broad sense to include means for the retarding of the motion of a fluid which may be moved by other means as well as the more direct pumping and moving of a fluid.

What is claimed is:

1. In a system for the confinement of a diamagnetic fluid, means defining a confinement space which extends generally along a central line, means generating a magnetic field at least partially parallel to said central line, means generating a plurality of local strong matnetic field confinement regions, and pumping means for pumping said diamagnetic fluid generally along said central line relative to said local strong magnetic field confinement regions, said central line being closed upon itself to form an endless path for movement of said diamagnetic fluid.

2. In a diamagnetic fluid confinement system, means defining a confinement space which extends generally along a confinement central line, means generating a confining magnetic field at least partially parallel to said central line, means generating a time varying pattern of local strong magnetic field confinement regions, the number of said local strong confinement regions being greater than zero for at least a substantial fraction of the time, and said time varying pattern being such that substantially all of said confinement space along said central line is periodically subjected to the effects of said local strong confinement regions.

3. The fluid confinement system of claim 2 wherein said confinement space includes several identifiable regions, and said means generating a time varying pattern includes means to change the strength of the magnetic field in each of said several regions to a lower strength and to cycle the magnetic field strength in each region from said lower strength to said strong magnetic field sequentially so that said strong magnetic field moves between at least two adjacent regions in a time cycle.

4. The method of confining a diamagnetic fluid in a confinement space comprising subjecting said fluid to the effects of a plurality of local strong magnetic field confinement regions throughout substantially all of said confinement space which are separated by local weak magnetic field confinement regions while periodically moving the local strong magnetic field confinement areas relative to each other so that substantially all of said confinement space is subjected to local strong magnetic field confinement regions.

5. In a diamagnetic fluid confinement system, means defining a confinement space, means generating a plurality of local strong magnetic field confinement regions and causing said local strong confinement regions to move relative to each other within said confinement space so that substantially all of said confinement space is periodically subject to the effects of said local strong confinement regions.

6. The combination of claim 5 and means to cause the generation of at least one weak local magnetic field confinement region and wherein a subset of said local strong magnetic field confinement regions are separated from each other by said weak local magnetic field confinement regions.

7. The combination of claim 5 further characterized by the diamagnetic fluid being a plasma and the means causing the local strong confinement regions to move including means to cause the magnetic field in each confinement region to vary in a periodic cycle, the frequency of the major periodic magnetic field variations corresponding to the motion of said local strong confinement regions being substantially lower than the cyclotron resonant frequencies of the plasma particles in the major confining magnetic field.

8. In a diamagnetic fluid confinement system, means defining a confinement space which extends generally along a confinement central line, means generating a confining magnetic field at least partially parallel to said central line including means generating a plurality of local strong magnetic field confinement regions and including means causing said local strong confinement regions to move relative to each other such that substantially all of said confinement space along said central line is periodically subject to the effects of said local strong confinement regions.

9. The combination of claim 8 further characterized by the diamagnetic fluid being a plasma and by the means causing said local strong confinement regions to move relative to each other including means providing periodic magnetic field variations at a frequency substantially lower than the cyclotron resonant frequencies of the plasma particles in the major confining magnetic field.

10. The combination of claim 8 in which said central line extends from one extreme part of said means defining said confinement space to a different extreme part of said means defining said confinement space, and does not close upon itself within said confinement space.

11. The combination of claim 10 further characterized by the diamagnetic fluid being a plasma and by the means causing said local strong confinement regions to move relative to each other including means providing periodic magnetic field variations of frequency substantially lower than the cyclotron resonant frequencies of the plasma particles in the major confining magnetic field.

12. The combination of claim 8 in which said central line is closed upon itself and said means forming said confinement space comprises a ring.

13. The combination of claim 12 further characterized by the diamagnetic fluid being a plasma and by the means causing said local strong confinement regions to move relative to each other including means providing periodic magnetic field variations of frequency substantially lower than the cyclotron resonant frequencies of the plasma particles in the major confining magnetic field.

* * * * *